(12) United States Patent
Kirollos et al.

(10) Patent No.: US 12,110,988 B2
(45) Date of Patent: Oct. 8, 2024

(54) POSITION SENSOR FOR A FLUID FLOW CONTROL DEVICE

(71) Applicant: OFIP LIMITED, Oxford (GB)

(72) Inventors: Benjamin Kirollos, Oxford (GB); Vikram Sridhar, Oxford (GB); Christopher Kennell, Oxford (GB); Matthew Collins, Oxford (GB)

(73) Assignee: OFIP Limited, Oxford (GB)

( * ) Notice: Subject to any disclaimer, the term of this patent is extended or adjusted under 35 U.S.C. 154(b) by 57 days.

(21) Appl. No.: 17/616,411

(22) PCT Filed: Jun. 3, 2020

(86) PCT No.: PCT/GB2020/051335
§ 371 (c)(1),
(2) Date: Dec. 3, 2021

(87) PCT Pub. No.: WO2020/245578
PCT Pub. Date: Dec. 10, 2020

(65) Prior Publication Data
US 2022/0235879 A1   Jul. 28, 2022

(30) Foreign Application Priority Data
Jun. 7, 2019 (GB) ....................... 1908174
Mar. 24, 2020 (WO) ................ PCT/GB2020/050784

(51) Int. Cl.
*F16K 37/00* (2006.01)
*F16K 1/12* (2006.01)
(Continued)

(52) U.S. Cl.
CPC ............ *F16K 37/0033* (2013.01); *F16K 1/12* (2013.01); *F16K 1/38* (2013.01); *G01L 9/0082* (2013.01)

(58) Field of Classification Search
CPC .......... F16K 37/0033; F16K 1/12; F16K 1/38; G01L 9/0082
See application file for complete search history.

(56) References Cited

U.S. PATENT DOCUMENTS 1,321,751 A   11/1919   Johnson
1,483,991 A    2/1924   Slattery
(Continued)

FOREIGN PATENT DOCUMENTS

CN   108006313 A   5/2018
DE     3740708 A1  6/1989
(Continued)

OTHER PUBLICATIONS

Cla-Val Model X117C Valve Position Transmitter Installation | Operation | Maintenance engineering data sheet, Cla-Val, Newport Beach, CA, USA, Jan. 2008, 4 pages.
(Continued)

*Primary Examiner* — Angelisa L. Hicks
(74) *Attorney, Agent, or Firm* — Withrow & Terranova, PLLC; Vincent K. Gustafson (57) ABSTRACT

A device for controlling the flow of a fluid through a conduit from an upstream side of the device to a downstream side of the device. The device includes a valve housing having defined therein a valve aperture, a valve member movably mounted relative to the valve aperture. The valve member is arranged to be displaced reciprocally in a direction to selectively open and close the valve aperture. The device also includes a magnet mounted on or relative to the valve member, with the magnet being displaced by displacement of the valve member. A plurality of magnetic field sensors are mounted on the valve housing.

20 Claims, 8 Drawing Sheets

(51) Int. Cl.
    *F16K 1/38* (2006.01)
    *G01L 9/00* (2006.01)

(56) References Cited

U.S. PATENT DOCUMENTS

| | | | |
|---|---|---|---|
| 1,727,517 | A | 9/1929 | Moody |
| 1,752,439 | A | 4/1930 | Larner |
| 1,824,916 | A | 9/1931 | Moody |
| 2,919,714 | A | 1/1960 | Mrazek |
| 3,429,331 | A | 2/1969 | Prevost |
| 3,515,165 | A * | 6/1970 | Zadoo .............. G05D 16/2097 137/220 |
| 4,096,747 | A * | 6/1978 | Gilson .................. G01F 3/16 73/251 |
| 4,285,495 | A | 8/1981 | King |
| 4,809,742 | A | 3/1989 | Grau |
| 5,228,469 | A | 7/1993 | Otten et al. |
| 5,971,353 | A | 10/1999 | Johnson |
| 6,029,691 | A | 2/2000 | Tavor |
| 6,152,172 | A | 11/2000 | Christianson et al. |
| 6,220,272 | B1 | 4/2001 | Tavor |
| 6,670,806 | B2 | 12/2003 | Wendt et al. |
| 7,190,159 | B2 | 3/2007 | Galbreath et al. |
| 8,517,333 | B2 | 8/2013 | Briley et al. |
| 8,931,504 | B2 | 1/2015 | Canjuga |
| 9,303,786 | B2 | 4/2016 | Le Moing et al. |
| 9,915,372 | B2 | 3/2018 | Esveldt |
| 2004/0216782 | A1 | 11/2004 | Mares et al. |
| 2008/0092960 | A1 | 4/2008 | Manecke et al. |
| 2009/0120515 | A1 * | 5/2009 | Ohtani ................ F16K 5/0407 137/553 |
| 2009/0193965 | A1 * | 8/2009 | Paluncic ................ F16N 25/02 251/324 |
| 2013/0340428 | A1 | 12/2013 | Graichen et al. |
| 2014/0236514 | A1 * | 8/2014 | Icove .................... H04N 7/18 348/148 |
| 2014/0271138 | A1 | 9/2014 | Markyvech et al. |
| 2015/0323697 | A1 | 11/2015 | Ohmer et al. |
| 2016/0123492 | A1 * | 5/2016 | Tibben ................ F16K 31/163 251/57 |
| 2016/0139608 | A1 | 5/2016 | Eickhoff |
| 2018/0245707 | A1 | 8/2018 | Goll et al. |
| 2018/0313069 | A1 | 11/2018 | Cipriani et al. |
| 2020/0182375 | A1 | 6/2020 | Böhm et al. |
| 2021/0270386 | A1 | 9/2021 | Collins et al. |

FOREIGN PATENT DOCUMENTS

| | | | | |
|---|---|---|---|---|
| DE | 102012109094 | A1 | 3/2014 | |
| DE | 202017002504 | U1 | 8/2018 | |
| EP | 2960560 | A1 | 6/2014 | |
| EP | 3421850 | A1 | 1/2019 | |
| GB | 2582747 | A * | 10/2020 | ............. E21B 34/10 |
| HR | 20100273 | A2 | 11/2011 | |
| JP | H07317574 | A | 12/1995 | |
| JP | 2012107929 | A | 6/2012 | |
| WO | 9427069 | A1 | 11/1994 | |
| WO | 2010133902 | A2 | 11/2010 | |
| WO | 2011120338 | A1 | 10/2011 | |
| WO | 2014014234 | A1 | 1/2014 | |
| WO | 2019220153 | A2 | 11/2019 | |

OTHER PUBLICATIONS

"Fisher 4200 Electronic Position Transmitters" product bulletin, Fisher Controls International LLC, Aug. 2018, 8 pages.
"Fisher 4320 Wireless Position Monitor" product bulletin, Fisher Controls International LLC, Oct. 2017, 12 pages.
Lathan et al., "Slide-By Sensing for Long-Stroke Applications Using Allegro Angle Sensors" application information, 1 \llegro MicroSystems, LLC, Worcester, MA, USA, 2016, 9 pages.
MLX90333 Position Sensor Datasheet, Revision 008, Melexis NV, Sep. 26, 2017, 48 pages.
Examination Report No. 2 for Australian Patent Application No. 2020249779 mailed Apr. 16, 2021, 6 pages.
Notice of Acceptance for Australian Patent Application No. 2020249779 mailed Jul. 30, 2021, 3 pages.
Official Action (Communication pursuant to Article 94(3) for European Patent Application No. 20716881.6 mailed Feb. 12, 2021, 8 pages.
Examination Report for European Patent Application No. 20716881. 6, mailed Aug. 25, 2021, 8 pages.
Search Report under Section 17(5) for United Kingdom Patent Application No. GB1908174.4 mailed Oct. 21, 2019, 3 pages.
Search Report under Section 17{5) for United Kingdom Patent Application No. GB1904254.8 mailed Jul. 8, 2019, 3 pages.
Notification of Transmittal of International Search Report and Written Opinion (Form PCT/ISA/220), International Search Report (Form PCT/ISA/210), and Written Opinion (Form PCT/ISA/237) for International Application No. PCT/IB2020/050784 mailed Jun. 18, 2020, 15 pages.
Notification of Transmittal of International Search Report and Written Opinion (Form PCT/ISA/220), International Search Report (Form PCT/ISA/210), and Written Opinion (Form PCT/ISA/237) for International Application No. PCT/GB2020/051335 mailed Jul. 13, 2020, 15 pages.
Ziegler et al., "Sensors and Detection Techniques," Southwest Jiaotong University Press, Jan. 2018, pp. 167-172.
Advisory Action and AFCP 2.0 Decision for U.S. Appl. No. 17/258,686, mailed Sep. 13, 2022, 4 pages.
Notice of Allowance for U.S. Appl. No. 17/258,686, mailed Nov. 7, 2022, 9 pages.
Office Action for Canadian Patent Application No. 3103757, mailed Sep. 20, 2022, 3 pages.
Second Office Action for Chinese Patent Application No. 20208003229. 4, mailed Sep. 28, 2022, 21 pages.
Examination Report for European Patent Application No. 20716881. 6, mailed Jun. 29, 2022, 8 pages.
Final Office Action for U.S. Appl. No. 17/258,686, mailed Jul. 8, 2022, 12 pages.
Non-Final Office Action for U.S. Appl. No. 17/258,686, mailed Feb. 1, 2022, 14 pages.
First Office Action for Chinese Patent Application No. 20208003229. 4, mailed Feb. 14, 2022, 17 pages.
Non-Final Office Action for U.S. Appl. No. 18/178,925, mailed Jan. 31, 2024, 12 pages.
Final Office Action for U.S. Appl. No. 18/178,925, mailed Jun. 25, 2024, 14 pages.
Extended European Search Report for European Patent Application No. 24164430.1, mailed Jun. 11, 2024, 9 pages.

* cited by examiner

Choosing the value of M that minimises spread in X

POSITION SENSOR FOR A FLUID FLOW CONTROL DEVICE

This application is a 35 U.S.C. § 371 national phase filing of International Application No. PCT/GB2020/051335 filed on Jun. 3, 2020 and claims the benefit of International Application No. PCT/GB/2020/050784 filed on Mar. 24, 2020 and United Kingdom Patent Application No. 1908174.4, filed on Jun. 7, 2019, wherein the entire contents of the foregoing applications are hereby incorporated by reference herein.

The present invention relates to a position sensor for determining the position of a valve member in a control valve, in particular to an electronic position sensor that measures the strength of a magnetic field.

In fluid flow systems such as pipes and conduits, e.g. as can be found in many different industrial situations such as the oil and gas industry, there is a need to control the flow of fluid in a fluid flow stream through the conduit. Devices such as fluid flow control valves and pressure regulators may be used to control or regulate the fluid flow or pressure through the conduit. Such devices may deliver a desired flow rate, or an upstream or downstream pressure, and thus may be controllable in a range between a fully open and fully closed position. Alternatively, such devices may simply act as shut-off valves, being moved between a fully open and fully closed position.

A valve member is typically the moving part in such valves and is actuated to open and close the valve. Thus, in order for flow rate or pressure to be precisely and accurately controlled, it may be important for the user to know the position of the valve member, as this will determine the extent to which the flow is being throttled. In applications wherein it is important for the valve to be either fully open or fully closed (e.g. during an emergency), the position of the valve member may be determined to reassure the user that the valve has been actuated accordingly.

A magnet attached to the valve member and a magnetic field sensor attached to the housing of the valve may be used to determine the position of the valve member. However, as the strength of the magnetic field of the magnet deteriorates over time and in response to changes in temperature, this lead to a loss of accuracy without regular recalibration of the magnetic field sensor. This can be costly and impractical, for example, in a situation where the valve is installed in a remote (e.g. subterranean or subsea) location.

The present invention aims to provide an improved position sensor for determining the position of a valve member in a fluid flow control device.

When viewed from a first aspect, the invention provides a device for controlling the flow of a fluid through a conduit from an upstream side of the device to a downstream side of the device, the device comprising:
  a valve housing having defined therein a valve aperture;
  a valve member movably mounted relative to the valve aperture and arranged to be displaced reciprocally in a direction to selectively open and close the valve aperture;
  a magnet mounted on or relative to the valve member, wherein the magnet is arranged to be displaced by the displacement of the valve member in a direction parallel to the direction of displacement of the valve member; and
  a plurality of magnetic field sensors mounted at a plurality of different positions on the valve housing.

The present invention provides a fluid flow control device (e.g. a control valve or a pressure regulator) in which a valve member controls the flow of fluid through a valve aperture defined in the housing of the device, thus allowing the fluid flow in a conduit in which the device is installed to be controlled between the upstream and downstream sides of the device. A magnet, mounted on or relative to the valve member, and a plurality of magnetic field sensors (for measuring the magnetic field (e.g. strength and/or angle) of the magnet), mounted on the valve housing, together allow the position of the valve member in the fluid flow control device to be determined, e.g. using the electrical output of the magnetic field sensors owing to the relative movement of the magnetic field of the magnet to the magnetic field sensors.

The magnet is mounted such that it is displaced by the reciprocal movement of the valve member in the same direction as the valve member (allowing the position of the valve member to be determined from the detected position of the magnet). Thus the magnet is moved relative to (e.g. towards and away from) the valve aperture (and also moved relative to the rest of the housing). The multiple magnetic field sensors are mounted on the housing, e.g. in a fixed position relative to the valve aperture, such that the magnet is moved by the valve member relative to the magnetic field sensors. The magnetic field sensors are arranged to detect the changes in the magnetic field they experience from the magnet as it moves relative to them, which allows the position of the valve member to be determined.

It will be appreciated that by providing multiple magnetic field sensors, a more accurate determination of the position of the valve member may be made (e.g. owing to the more accurate measurement of the movement of the magnetic field of the magnet that may be made). This may be performed in a more economical way than by using a multiple axis magnetic field sensor. However, a plurality of multiple axis sensors may be used. In at least preferred embodiments, providing multiple magnetic field sensors may allow the measurements to be automatically calibrated for changes (e.g. degradation) of the magnetic field of the magnet with time and/or temperature.

The fluid flow control device may comprise any suitable and desired type of device that is used to control the flow of a fluid through a conduit from an upstream side of the device to a downstream side of the device. For example, the fluid flow control device may comprise a control valve or a pressure regulator. In some embodiments, the device may be arranged to operate as a shut-off valve, e.g. the valve member may be arranged to be moved (only) between a fully open position and a fully closed position of the valve aperture. In some embodiments, the device may be arranged to provide more varied control over the flow of fluid through the valve aperture, e.g. the valve member may be arranged to be moved between a (e.g. continuous) range of positions between the valve aperture being fully open and fully closed.

In a preferred set of embodiments, the fluid flow control device comprises an axial fluid flow control device. Thus preferably the predominant flow of fluid through the device is in an axial direction. Preferably the upstream and downstream sides of the device are coaxial with each other. Thus preferably the device comprises a valve inlet and a valve outlet, wherein the valve inlet is coaxial with the valve outlet. This allows the device to be inserted easily into the conduit, e.g. into a section of pipework. In a set of embodiments, the device comprises an upstream flange (e.g. surrounding the valve inlet) and a downstream flange (e.g. surrounding the valve outlet) for connecting to (e.g. corresponding flanges of) the conduit.

Preferably the valve aperture (which is, e.g., defined in the valve inlet or the valve outlet) is coaxial with the upstream and downstream sides of the device (and thus, e.g., with the valve inlet and the valve outlet). Preferably the valve member is coaxial with the upstream and downstream sides of the device (and thus, e.g., with the valve inlet and the valve outlet). Preferably the valve member is coaxial with the valve aperture.

This is considered to be novel and inventive in its own right and thus when viewed from a second aspect, the invention provides a device for controlling the flow of fluid through a conduit from an upstream side of the device to a downstream side of the device, the device comprising:

- a valve housing having defined therein a valve inlet, a valve outlet and a valve aperture, wherein the valve inlet, the valve outlet and the valve aperture are coaxial with each other;
- a valve member movably mounted relative to the valve aperture and arranged to be displaced reciprocally in an axial direction coaxial with the valve aperture to selectively open and close the valve aperture;
- a magnet mounted on or relative to the valve member, wherein the magnet is arranged to be displaced by the displacement of the valve member in a direction parallel to the direction of displacement of the valve member; and
- a magnetic field sensor mounted on the valve housing.

It will be appreciated that this aspect of the invention may (and preferably does) include one or more (e.g. all) of the optional and preferred features outlined herein.

Thus, in a preferred set of embodiments the fluid flow control device has an axis (e.g. of rotational symmetry) extending through the device which is coaxial with one or more (e.g. all) of the valve member (and the direction along which it moves reciprocally), the valve aperture, the valve inlet, the valve outlet, the upstream side of the conduit and the downstream side of the conduit. Preferably one or more (e.g. all) of the valve aperture, the valve inlet, the valve outlet and the (upstream and/or downstream sides of the) conduit surround the axis and have a cross-sectional area centred on the axis in a plane perpendicular to the axis.

The valve housing, which, inter alia (in at least preferred embodiments), defines the valve aperture and on which the magnetic field sensor(s) are mounted, may be provided in any suitable and desired way. Preferably the housing defines the valve inlet and the valve outlet, where provided. Preferably the housing comprises the upstream flange and the downstream flange, where provided.

The valve member may be mounted relative to the valve aperture (and thus to the housing) in any suitable and desired way, such that the valve member is able to be displaced reciprocally to selectively open and close the valve aperture (or to assume a position therebetween). In a preferred set of embodiments, the valve member is mounted on the housing. Preferably the housing comprises a valve core on which the valve member is mounted.

The valve member may be mounted on the (e.g. valve core of the) housing in any suitable and desired way. In one embodiment the valve member is mounted around the valve core, e.g. the valve member may comprise a cap that surrounds, and moves over the outer surface of, the valve core. In one embodiment the valve member is mounted in the valve core, e.g. the valve member may comprise a piston that extends and moves within the valve core. Thus preferably the valve core (e.g. the part over or in which the valve member moves) is substantially cylindrical (e.g. rotationally symmetric).

The magnet, which is mounted on or relative to the valve member, may comprise any suitable and desired magnet. Preferably the magnet comprises a permanent magnet. Preferably the fluid flow control device comprises a sheath surrounding the magnet. The sheath helps to protect the magnet, which may be quite brittle. The sheath may help to avoid contact of the magnet with the working fluid of the fluid flow control device (i.e. the fluid flowing through the conduit whose flow is being controlled). This may be required, for example, when the fluid flow control device is used in the water industry, for regulatory approval. The sheath may also help to reduce the friction of the magnet as it is displaced.

Preferably the magnet is longitudinally extended (i.e. having a length greater than its width (e.g. diameter)), e.g. in the direction in which the valve member (and thus the magnet) is arranged to be displaced. Preferably the magnet is cylindrical, e.g. being longitudinally extended in the direction in which the cross-section of the cylinder is projected (along the length of the cylinder).

The magnet may be mounted on or relative to the valve member in any suitable and desired way. In a preferred set of embodiments, the magnet is mounted such that the magnet retains the same circumferential and/or radial position (e.g. relative to the housing and/or axis of the fluid flow control device) when the magnet is displaced by the valve member, e.g. even when the valve member rotates (circumferentially) relative to the housing.

The magnet retaining the same circumferential and/or radial position during operation helps to maintain the same positional relationship between the magnet and the magnetic field sensor(s) (apart from the intended (e.g. axial) displacement of the magnet with the valve member) and thus maintains a consistent environment for (e.g. the (e.g. non-ferrous) material (such as plastic or metal) of the device between) the magnet and the magnetic field sensor(s). This helps the position of the valve member to be determined accurately, e.g. even when the valve member rotates (circumferentially) relative to the housing (which can be common during operation), because the magnetic field strength and angle experienced by the magnetic field sensor(s) does not vary with rotation of the valve member. Furthermore, the fixed circumferential and/or radial position helps to preserve the magnetic field angle experienced by the magnetic field sensor(s) as the magnet deteriorates.

In one set of embodiments, the magnet is mounted (directly) on (i.e. attached to) the valve member, e.g. such that the magnet is fixedly (e.g. rigidly) connected to the valve member. Thus the movement of the magnet corresponds directly to the movement of the valve member. The magnet may be mounted along the axis of the valve member, e.g. within a piston shaft of the valve member (locating the magnet within the valve member helps to isolate the magnet from the working fluid of the fluid flow control device). Thus, for example, the magnet is longitudinally extended along the axis of the valve member. The magnet may comprise an annular (e.g. circumferentially symmetric) magnet, e.g. mounted around the (e.g. axis of the) valve member. Providing a magnet at the central axis of the valve member or circumferentially extending around the central axis of the valve member helps to retain the magnet at the same circumferential and radial position.

In one set of embodiments the magnet is mounted relative (but not necessarily attached) to the valve member. Thus preferably the magnet is discrete (i.e. a separate component) from the valve member. Preferably the magnet is acted on by the valve member such that it is displaced by the valve member in the same direction as the displacement of the valve member.

In some embodiments the magnet may be acted on directly by the valve member, e.g. the valve member may contact the magnet directly. In some embodiments the magnet may be acted on indirectly by the valve member, e.g. the valve member may not contact the magnet directly. Instead, the valve member may act on a sheath around the magnet or on another component between the valve member and the magnet.

In one embodiment, the fluid flow control device comprises a spacer between the valve member and the magnet, wherein the valve member is arranged to displace (e.g. directly contact) the spacer so to displace the magnet (e.g. the spacer may in turn contact the magnet (or its sheath) directly). A spacer may be used to help to position the magnet relative (e.g. closer) to the magnetic field sensor(s).

In one set of embodiments (e.g. when the magnet is not attached to or integral with the valve member) the magnet is biased towards the valve member. Preferably the fluid flow control device comprises a biasing member (e.g. a (e.g. compression) spring) arranged to bias the magnet towards the valve member. Preferably the magnet is located between the valve member and the biasing member. Biasing the magnet towards the valve member helps to maintain the same (e.g. axial) position of the magnet relative to the valve member (e.g. to keep the magnet (or the sheath or the spacer) in contact with the valve member).

Preferably the biasing member is arranged to (e.g. exert a sufficient biasing force against the magnet to) maintain the magnet (or the sheath or the spacer) in contact with the valve member. However, preferably the biasing force exerted by the biasing member on the valve member (e.g. via the magnet) is negligible (e.g. about 1% of) compared to the other forces acting on the valve member, e.g. from the (upstream or downstream) fluid pressure of the working fluid, from a control pressure of a control fluid acting on the valve member and/or from a spring force of a (main) biasing spring acting on the valve member.

In one set of embodiments (e.g. when the magnet is not (rigidly) attached to or integral with the valve member) the fluid flow control device comprises a (e.g. longitudinally extended, e.g. in the axial direction) cavity in which the magnet is located and arranged to be displaced. Preferably the biasing member is located in the cavity, e.g. the magnet is located between the valve member and the biasing member. Preferably the biasing member is made from a nonferrous material.

Preferably, when the magnet is located within a cavity, the cavity comprises a pressure balancing aperture. This is provided to help any build-up of unwanted pressure within the cavity to be vented, e.g. to a control space (within the device) with which the cavity is fluidly connected via the pressure balancing aperture.

The displacement of the magnet in the direction towards the valve member may be restricted by a retaining feature of the magnet assembly and/or the valve housing. Preferably the magnet comprises one or more grooves which extend axially along the magnet and the valve housing comprises a stopping member protruding from the valve housing (e.g. partially over the entrance to the cavity), wherein the stopping member is arranged to project into the one or more grooves. Preferably the stopping member is complementary to the one or more grooves, e.g. such that the stopping member runs in the one or more grooves during displacement of the magnet and such that the stopping member abuts the end of the groove at the desired (e.g. maximum) displacement of the magnet, thereby halting the displacement of the magnet and retaining it in the cavity. Preferably the engagement of the stopping member with the one or more grooves prevents rotation of the magnet, such that circumferential asymmetry of the magnetic field does not affect the accuracy of the position measurement. Preferably the stopping member is arranged to engage with the end of the one or more grooves (e.g. only) when the valve member is removed from the valve housing. Thus, in at least preferred embodiments, during normal operation of the fluid flow control device, the displacement of the magnet is such that the stopping member does not act to restrict displacement of the magnet.

The magnet may be mounted relative to the valve member (and thus, for example, the cavity may be formed) in any suitable and desired part of the fluid flow device. Preferably the magnet is movably mounted on the (e.g. valve core of the) housing. Preferably the cavity is formed in the (e.g. valve core of the) housing. Preferably the (e.g. sheath of the) magnet (or, e.g., the cavity) is exposed to the working fluid (and thus, for example, the operating pressure of the fluid) flowing through the fluid flow control device.

Preferably the magnet is (e.g. movably) mounted at a position that is radially offset from the central axis of the fluid flow control device (and thus the valve member). This may help to position the magnet closer (e.g. radially) to the magnetic field sensor(s). When the magnet is mounted relative to (and thus not on) the valve member, preferably it is mounted (e.g. in the cavity) such that it retains its circumferential and/or radial position, e.g. even when the valve member rotates circumferentially.

In one embodiment, the valve member comprises an (e.g. circumferentially extended) annular groove for receiving (e.g. locating) the end of the magnet (or the sheath or the spacer). The end of the magnet (or the sheath or the spacer) thus preferably comes into contact with (and is thus moved by) the valve member in the annular groove. The groove helps to maintain the radial position of the magnet while allowing the valve member to rotate, e.g., circumferentially (and thus helps to magnet to maintain its circumferential position even when the valve member, and thus the magnet, is being moved in an axial direction).

The magnet may be any suitable and desired size. Preferably the magnet has a length (e.g. in the axial direction) that is greater than the maximum (e.g. axial) displacement of the valve member. This helps to provide a (e.g. axial) position on the (e.g. housing of the) fluid flow control device at which the magnet overlaps at all (e.g. axial) displacements of the valve member (and thus the magnet). Preferably the length of the magnet is greater than or equal to the sum of the maximum (e.g. axial) displacement of the valve member and the (e.g. axial) spread of the magnetic field sensors. This allows the magnetic field sensors to be (and in an embodiment they are) positioned such that they overlap with the magnet at all (e.g. axial) displacements of the valve member.

The plurality of magnetic field sensors may be mounted at the plurality of different positions on the valve housing in any suitable and desired way. In one embodiment the plurality of magnetic field sensors are mounted on an outer casing of the valve housing. This allows easy access to the magnetic field sensors, e.g. for attaching readout wiring thereto. In a preferred set of embodiments, the plurality of magnetic field sensors are mounted on or in the valve core of the housing. This may allow the magnetic field sensors to be located close to the magnet.

For example, when the magnet is movably mounted in (e.g. the valve core of) the housing, the plurality of magnetic field sensors may be located very close to the magnet. This helps to reduce the amount of material between the magnet and the magnetic field sensors, which helps to allow the magnetic field sensors to make an accurate measurement of the magnetic field of the magnet, e.g. owing to the increased linearity and gradient of the magnetic field strength experienced by the magnetic field sensors. In one embodiment, the magnetic field sensors are mounted within 30 mm of the magnet (e.g. in the radial direction), e.g. approximately 20 mm from the magnet.

In one embodiment the (e.g. valve core of the) valve housing comprises one or more cavities in which the magnetic field sensors are located. The plurality of magnetic field sensors may be arranged in the same cavity or in a plurality of respective cavities.

Preferably the magnetic field sensor(s) (and thus, for example, the one or more cavities for the magnetic field sensors) are arranged at (e.g. exposed to) atmospheric pressure. Preferably the magnetic field sensor(s) are isolated from (i.e. not exposed to) the (e.g. fluid pressure of the) working fluid of the fluid flow control device, e.g. owing to where on or in the valve housing they are mounted. This allows the magnetic field sensor(s) (and, e.g., any associated electronics) to operate in a relatively safe environment and be accessed relatively easily. The magnetic field sensor(s) may, for example, not require complicated sealing mechanisms.

In a preferred set of embodiments, the magnetic field sensor(s) are fixedly (e.g. rigidly) mounted on the valve housing. Providing static magnetic field sensor(s) helps, for example, to simplify any connecting wiring and/or electronics. It may also allow static seal(s) (which are relatively simple and safe, e.g. compared to dynamic seal(s)) to be used to seal the magnetic fields sensor(s) in the housing.

The plurality of magnetic field sensors may be provided at a plurality of different (respective) positions in any suitable and desired way, e.g. so that they experience different magnetic field strength of the magnet from each other. In one embodiment the plurality of magnetic field sensors are radially spaced from each other. Preferably the plurality of magnetic field sensors are axially spaced from each other. In other embodiments the magnetic field sensors are angled between the radial and axial directions. Preferably the magnetic field sensors are angled so that the radial field lines from the magnet cut through the tops of the magnetic (e.g. Hall effect) sensors.

The plurality of magnetic field sensors may be spaced from each other by mounting them on a plurality of different (respective) substrates (e.g. printed circuit boards), e.g. for locating them in a plurality of different cavities in the valve housing. Alternatively, the plurality of magnetic field sensors are mounted, but spaced from each other, on the same substrate (e.g. printed circuit board), e.g. for locating the magnetic field sensors in the same cavity.

Thus, as appropriate, the one or more cavities may be longitudinally extended, e.g. radially or axially. For example, when the plurality of magnetic field sensors are located in the same cavity, the cavity may extend longitudinally in the axial direction (and thus the magnetic field sensors may be spaced axially from each other). Or, for example, when the plurality of magnetic field sensors are located in a plurality of cavities, the cavities may be spaced axially from each other (e.g. at the same circumferential position) but extend radially.

The plurality of magnetic field sensors may be spaced from each other by any suitable and desired distance. Preferably the magnetic field sensors are positioned on the valve housing within the maximum (e.g. axial) displacement of the magnet, e.g. when the magnetic field sensors are axially spaced from each other. This allows the magnetic field sensors to overlap with the magnet at all displacements of the magnet. However, in embodiments wherein the magnetic field sensors are multiple axis sensors, it may be possible to use a smaller (e.g. shorter) magnet.

The magnetic field sensor(s) may be any suitable and desired type of magnetic field sensors. In one set of embodiments the magnetic field sensor(s) comprise magnetic Hall effect sensor(s). The magnetic field sensor(s) may comprise multiple (e.g. dual) axis sensor(s). The multiple axis sensor(s) may be configured to determine the magnitude of the magnetic field in two (e.g. horizontal and vertical) axes. A magnetic field angle may be calculated from the output of the single or multiple axis magnetic field sensor or sensors. However, the magnetic field sensor(s) may comprise (e.g. cheaper) magnetic field angle or single axis sensor(s). A position of the valve member may be determined (e.g. by a control unit) from a calculated or a measured magnetic field angle. Using a magnetic field angle to determine the position of the valve member, rather than a magnitude of the magnetic field, can improve the range of displacements of the valve member that may be determined. Furthermore, the determination may be independent of fluctuations in temperature.

In one embodiment, the magnetic field sensor(s) may comprise Hall effect switch(es) (e.g. instead of or in addition to other magnetic field sensor(s)). The Hall effect switch(es) are preferably positioned on the valve housing at or outside the maximum (e.g. axial) displacement of the magnet (e.g. in either direction). The Hall effect switch(es) may thus use the discontinuity in the magnet field of the magnet to detect that the magnet has reached its maximum (e.g. axial) displacement (in either direction). Using Hall effect switch(es) in this way may be suitable for an on-off or shut-off valve, or to calibrate the measurements from the (e.g. intermediately positioned) other magnetic field sensor(s).

The fluid flow control device may comprise any suitable and desired number of magnetic field sensor(s). In a preferred set of embodiments, the fluid flow control device comprises two or more magnetic field sensors, e.g. three or more magnetic field sensors. Having three or more magnetic field sensors provides some redundancy, e.g. were one of the sensors to stop working.

In a preferred set of embodiments, the fluid flow control device comprises a control unit arranged to receive an output (e.g. a measurement of the magnetic field (e.g. strength and/or angle) of the magnet) from the magnetic field sensor(s). The control unit may be connected via a wired or wireless connection to the magnetic field sensor(s). Preferably the control unit is arranged to determine the position of the valve member, from the output received from the magnetic field sensor(s). Preferably the control unit comprises processing circuitry arranged to receive the output received from the magnetic field sensor(s) and to calculate the position of the valve member from the measured magnetic field (e.g. strength and/or angle). Preferably the processing circuitry is arranged to perform one or more (e.g. all) of the functions of the control unit, as appropriate.

The position of the valve member may be determined in any suitable and desired way. Measuring the position of the valve member helps to provide reassurance (e.g. to a user) that a valve aperture is fully open or fully closed, as desired.

The position of the valve member may be used to determine the amount by which the valve member is throttling the flow of fluid through the valve aperture. This, in turn, may allow the valve member to be positioned in a particular position, e.g. to deliver a desired amount of throttling. The position of the valve member may be used to allow the flow rate through the fluid flow control device to be determined (or estimated). The position of the valve member may be used as part of health checks and/or condition monitoring of the fluid flow control device.

In a preferred set of embodiments, the determined position of the valve member is used as part of a (e.g. active) feedback control loop. Thus preferably the control unit is arranged to control operation of the fluid flow control device using the determined position of the valve member, e.g. to position the valve member at a particular position. This may be done in any suitable and desired way, e.g. owing to the type of fluid flow control device being used. For example, the control unit may (e.g. control a pilot valve to) set a control pressure in the fluid flow control device (e.g. using the determined position of the valve member) to displace the valve member to a particular position. This allows the position of the valve member to be actively adjusted, so that, for example, that the fluid flow control valve may be controlled to operate in a particular way, e.g. at a constant flow rate.

In a preferred set of embodiments, the control unit is arranged to perform error minimisation on the output from the magnetic field sensor(s) to determine the position of the valve member. The error minimisation exploits the multiple measurements from the multiple magnetic field sensors (or the multiple axes of a multi-axis sensor) and helps to account for any changes of the magnet with temperature or time. Furthermore, depending on the error minimisation algorithm used, the temperature and/or the magnetisation of the magnet may also be determined (and thus in an embodiment the control unit is arranged to determine the temperature and/or the magnetisation of the magnet using the output from the magnetic field sensors).

In some embodiments, the fluid flow control device (e.g. control valve or pressure regulator) may have one or more of its operating parameters (e.g. upstream and/or downstream pressure, fluid flow rate through the device, control volume pressure, pilot valve pressure) monitored, in addition to the position of the valve member. The respective sensor(s) measuring these operating parameter(s) are preferably connected (e.g. provide feedback) to the control unit.

Preferably the fluid flow control device is operated, via the control unit, based on the operating parameter(s) of the fluid flow device. This helps to allow the fluid flow device to be controlled more precisely.

Certain preferred embodiments for the invention will now be described, by way of example only, with reference to the accompanying drawings in which.

There are many different industrial situations in which it is important for the exact displacement of a valve member within a valve to be determined. As will now be described, embodiments of the present invention provide apparatus that is able to determine such information.

Figure 1:
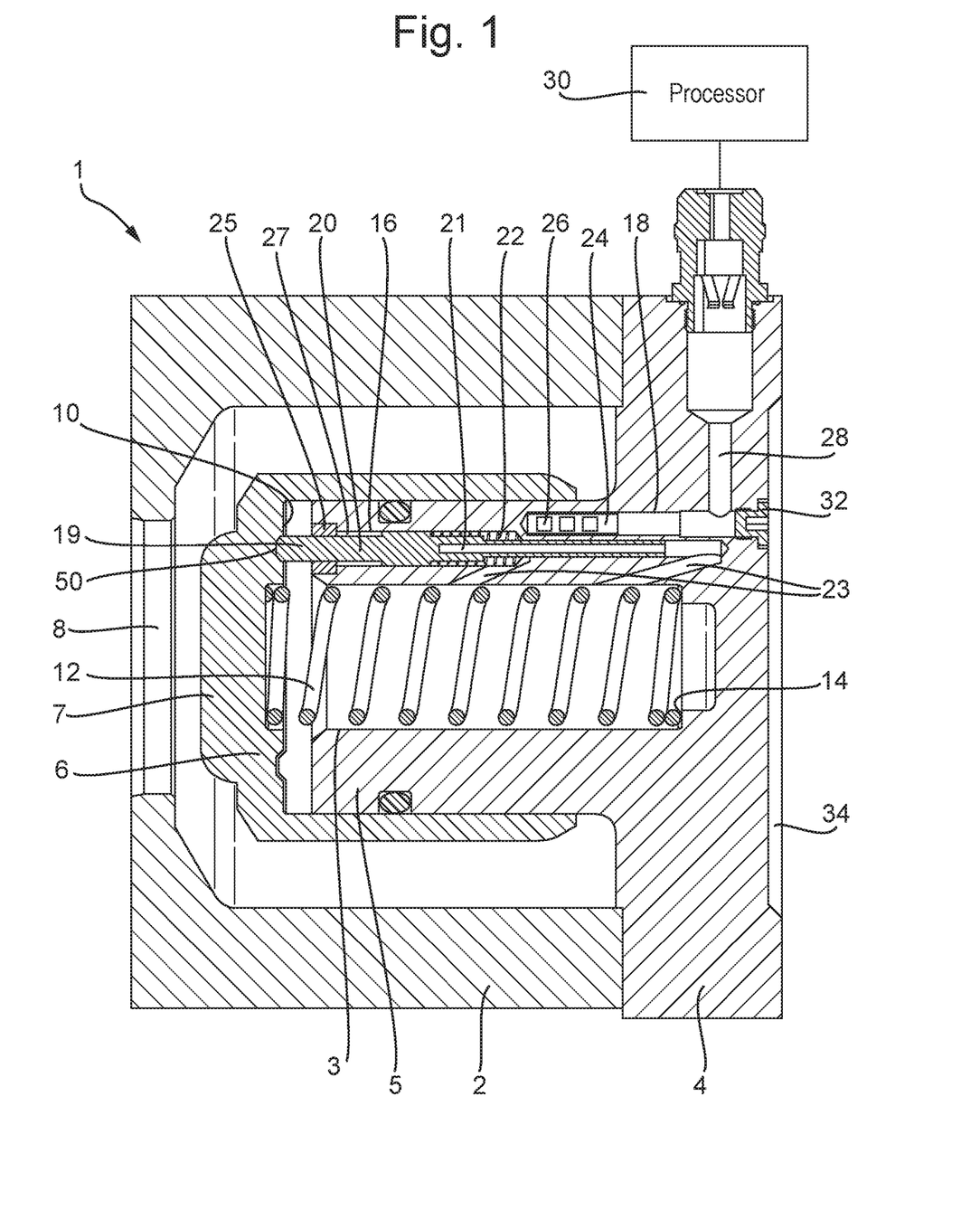
FIG. 1 shows a cross-sectional view of a device in accordance with an embodiment of the invention wherein both the magnet and the position sensors are axially mounted within the valve core.

FIG. 1 shows a cross-sectional view of a fluid flow device 1 comprising an electronic position sensing apparatus in accordance with an embodiment of the present invention. The device 1 comprises a housing 2, a valve core 4 and a cylindrical valve cap 6, all of which are made from non-ferrous materials (e.g. plastic or 316 stainless steel). The housing 2 defines an inlet aperture 8. The valve core 4 is mounted on the downstream end of the housing 2, and comprises a cylindrical upstream portion 5 which extends within the housing 2 in the upstream direction. The valve core 4 further comprises a number of outlet apertures 34.

The cylindrical valve cap 6 comprises a cylindrical central bore, the diameter of which is substantially equal to the diameter of the upstream portion 5 of the valve core 4. The valve cap 6 further comprises a cylindrical upstream portion 7 that extends centrally in the upstream direction. The diameter of the upstream portion 7 is substantially equal to the diameter of the inlet aperture 8. The valve cap 6 is arranged to move reciprocally along the outer surface of the upstream portion 5 of the valve core 4.

The valve cap 6 is movable between two extreme positions: a fully-closed position, wherein the upstream end 7 of the valve cap 6 is located fully within the inlet aperture 8 so as to prevent the flow of fluid through the aperture 8, and a fully-open position, wherein the inner surface 10 of the valve cap 6 abuts the upstream surface of the upstream portion 5 of the valve core 4 so as to allow a maximum flow rate through the aperture 8.

The valve core 4 comprises a central bore 3 that extends from the upstream surface of the valve core 4 to an inner surface 14. A spring 12 is positioned within the central bore 3 between the inner surface 10 of the valve cap 6 and the inner surface 14 of the valve core 4 such that the spring 12 acts to bias the valve cap 6 into the fully-closed position.

The valve core 4 further comprises a first axial hole 16 and a second axial hole 18. The first axial hole 16 extends into the valve core 4 from the upstream surface of the upstream portion 5 of the valve core 4. The second axial hole 18 extends into the valve core 4 from the downstream surface of the valve core 4.

A magnet subassembly 20 is located within the first axial hole 16. The magnet subassembly 20 comprises an extender portion 19 and a magnet 21, wherein the extender portion 19 is rigidly connected to the upstream end of the magnet 21 such that the extender portion 19 protrudes in the upstream direction towards the valve cap 6. The valve cap 6 comprises an annular groove 50 located to receive the upstream end of the extender portion 19 of the magnet subassembly 20. A non-ferrous spring 22 mounted around the magnet 21 within the first axial hole 16 acts to bias the magnet subassembly 20 towards the valve cap 6 such that the upstream surface of the extender portion 19 is continuously pushed against the annular groove 50 of the valve cap 6. In an alternative embodiment, the spring 22 may be positioned within the first axial hole 16 such that it acts between the downstream end of the magnet 21 and the downstream end of the first axial hole 16 to bias the magnet subassembly 20 towards the valve cap 6 in the same way. Therefore, any axial movement of the valve cap 6 results in an equal corresponding axial movement of the magnet subassembly 20 within the first axial hole 16.

The spring 22 is chosen to provide a force that is sufficient to maintain the contact between the magnet subassembly 20 and the inner surface 10 of the valve cap 6, even during fast operation of the valve, i.e. the momentum of the magnet subassembly 20 must be small in comparison to the force of the spring 22. However, the force of the spring 22 must also be small enough not to affect the operation of the main spring 12 (e.g. the spring 22 may provide around 1% of the overall spring force).

The magnet subassembly 20 is contained within a sheath to avoid direct contact with the fluid. The sheath acts as a protective layer and reduces friction as the magnet subassembly 20 moves axially. Furthermore, the sheath may be required in order to conform with requirements set by the Water Regulations Advisory Scheme (WRAS) and the 'ATEX' directives (Directives 99/92/EC and 94/9/EC).

The first axial hole 16 further comprises pressure balancing apertures 23 that extend between the first axial hole 16 and the central bore 3 of the valve core 4. The pressure balancing apertures 23 fluidly connect the first axial hole 16 and the valve core 4 such that any build-up of unwanted pressure within the first axial hole 16 may be vented to the central bore 3.

The magnet subassembly 20 further comprises grooves 27 which extend axially from the tip of the magnet subassembly 20 in the downstream direction. The valve core 4 comprises a stopping member 25 that partially protrudes from the upstream portion 5 of the valve core 4 into the entrance of the first axial hole 16 such that the stopping member 25 is arranged to project into the grooves 27 when the magnet subassembly 20 is located within the first axial hole 16. The stopping member 25 is complementary to the grooves 27 such that the stopping member 25 runs in the grooves 27 during displacement of the magnet subassembly 20 and such that the stopping member 25 abuts the downstream end of the grooves 27 at the maximum displacement of the magnet subassembly 20 in the direction of the inlet aperture 8, thereby halting the displacement of the magnet subassembly 20 and retaining it in the first axial hole 16.

The engagement of the stopping member 25 with the grooves 27 also prevents rotation of the magnet subassembly 20, such that circumferential asymmetry of the magnetic field does not affect the accuracy of the position measurement.

A printed circuit board (PCB) 24 is located within the second axial hole 18 and comprises three magnetic field sensors (Hall effect sensors) 26 arranged such that the magnetic radial field lines of the magnet 21 cut through the top of the sensors 26. Electric cables fed through a radial hole 28 extending from the second axial hole 18 to the exterior of the device 1 provide power to the PCB 24 and allow measurements of the magnetic field strength to be sent from each of the sensors 26 to a processor 30. The downstream end of the second axial hole 18 is sealed by a plug 32 that prevents the flow of fluid in to the second axial hole 18, thereby protecting the PCB 24.

The magnetic field strength measurements are processed by the processor 30 using an error minimisation algorithm in order to estimate the axial position of the valve cap 6. Such error minimisation would not be possible if only one magnetic sensor 26 were to be used.

The distance between the first axial hole 16 and the second axial hole 18 is chosen to maximise the linearity and gradient of the measured magnetic field strength signal. In this case, the distance between the magnet 21 and the sensors 26 is 20 mm.

In this embodiment, the magnet 21 is not rigidly connected to the moving element 6 of the valve 1. In axial flow valves, it is common for the moving element 6 to move circumferentially. If the magnet 21 were rigidly mounted on the valve cap 6, the circumferential movement of the valve cap 6 would result in a circumferential movement of the magnet 21 away from the sensors 26. As it is important to maintain an appropriate distance between the magnet 21 and the sensors 26 in order to ensure the accuracy of the field strength measurements, such an arrangement of the magnet 21 would be disadvantageous. On the other hand, the arrangement shown in this embodiment allows the valve cap 6 to move circumferentially without affecting the distance between the magnet 21 and the sensors 26.

The length of the magnet 21 is chosen to be equal to the travel of the valve cap 6 plus the length of the PCB 24 that is occupied by the sensors 26. Therefore, at all positions of the valve cap 6 between fully-open and fully-closed, the sensors 26 will be positioned axially within the end limits of the magnet 21. This is beneficial as the field strength of the magnet 21 becomes non-monotonic past the limits of the magnet 21.

Operation of the apparatus shown in FIG. 1 will now be described.

During normal operation of the valve 1, fluid flows into the valve 1 through the inlet aperture 8 and leaves the valve 1 via outlet apertures 34. The pressure of the upstream fluid on the upstream portion 7 of the valve cap 6 forces the valve cap 6 in the downstream direction, against the force of the spring 12. If the force of the fluid pressure exceeds the opposing force of the spring 12, the valve cap 6 is moved downstream towards its fully-open position.

As the magnet subassembly 20 is arranged to abut the inner surface 10 of the valve cap 6, the axial movement of the valve cap 6 causes the magnet subassembly 20 to be displaced, against the force of the spring 22, by a distance equal to the axial displacement of the valve cap 6. The movement of the magnet 21 relative to the sensors 26 means that a changing value of magnetic field strength is continuously measured by the sensors 26.

The magnetic field sensors 26 provide measurements of magnetic field strength to a processor 30, which interprets the data according to the calibration functions of each sensor 26.

Figure 2:
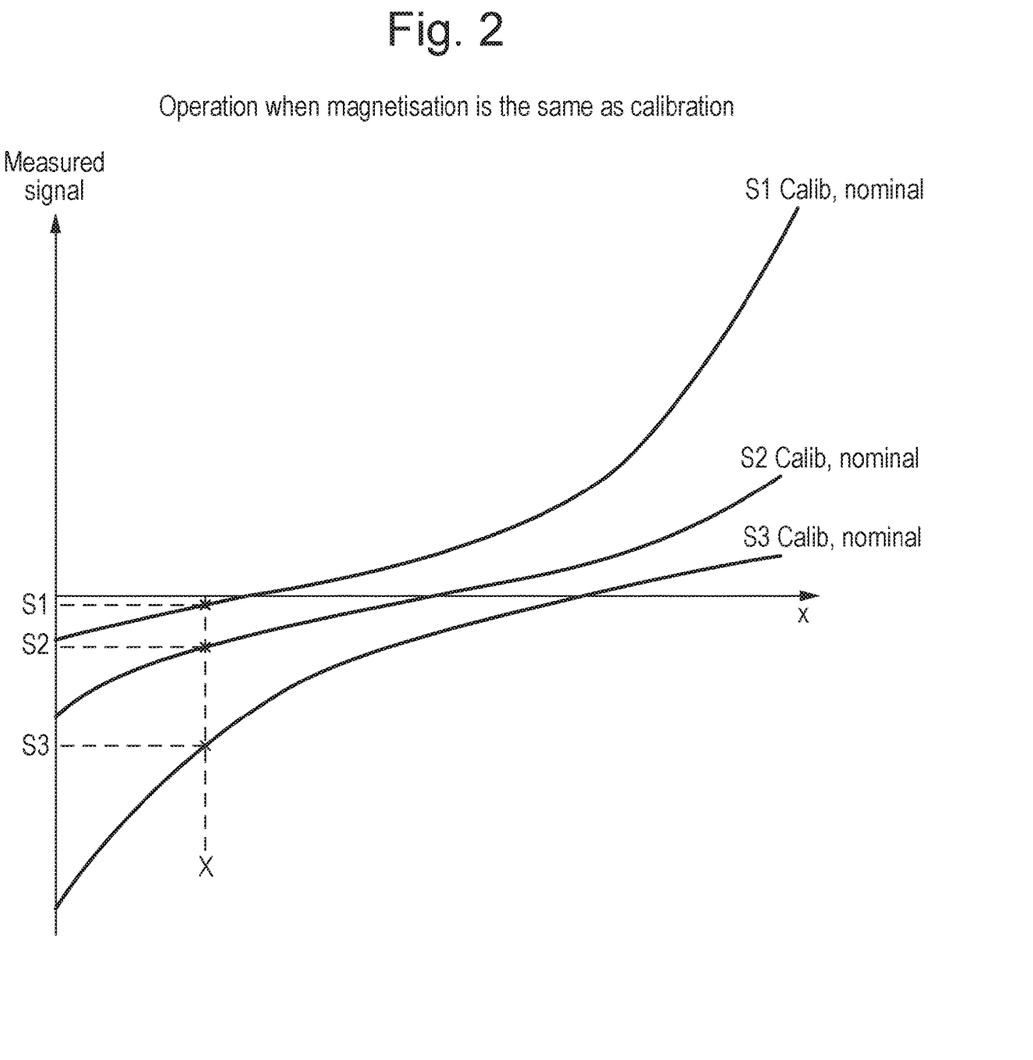
FIG. 2 shows exemplary position measurements for three position sensors for a nominal magnetisation of the magnet.

Exemplary calibration curves for three sensors 26, S1, S2 and S3, for a nominal magnetisation $M_0$ of the magnet 21 are shown in FIG. 2. As can be seen, the signal $s_i$ measured by each of the sensors 26 corresponds to an axial displacement $x_i$. If the magnetisation M of the magnet 21 is equal to the nominal magnetisation $M_0$, the instantaneous signal readings $s_i$ of each sensor 26 should correspond to the same value of displacement x.

Figure 3:
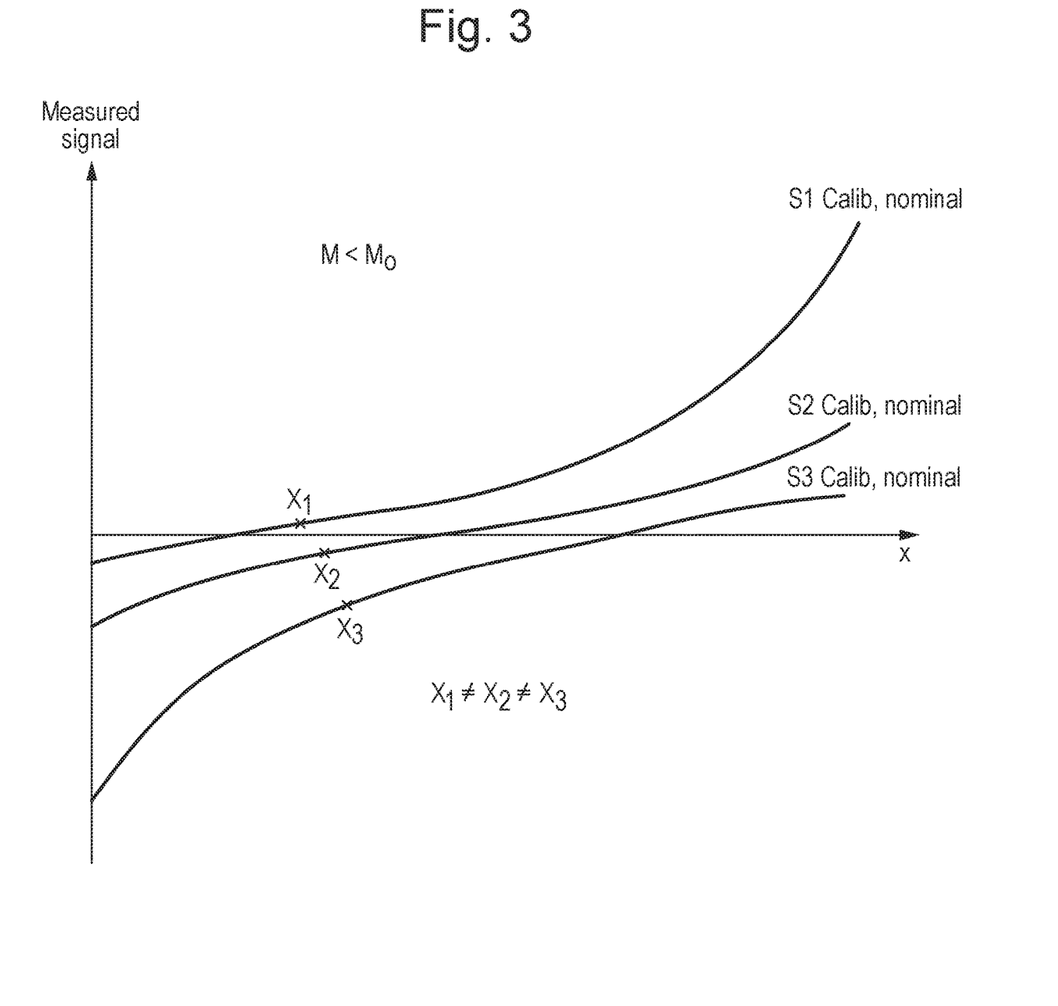
FIG. 3 shows exemplary position measurements for three position sensors when magnetisation is reduced but original calibration curves are used.

However, the magnetisation of magnets 21 naturally decreases over time and is further effected by other factors such as temperature. If the magnetisation M during operation is less than the nominal magnetisation $M_0$ and the original calibration curves are used, the inferred displacement $x_i$ from the three sensors 26 will be different, as shown in FIG. 3. It will be appreciated that this variation is a clear source of error.

The displacement $x_i$ of the magnet 21 at nominal magnetisation $M_0$ is given by the equation:

$$x_i = c_i^{-1}(s_i) \tag{1}$$

If the magnetisation M of the magnet 21 has been reduced from the nominal magnetisation $M_0$ by a factor of $$\frac{M}{M_0},$$

the displacement of the magnet is given by:

$$x_i = c_i^{-1}\left(\frac{s_i M_0}{M}\right) \tag{2}$$

Figure 4:
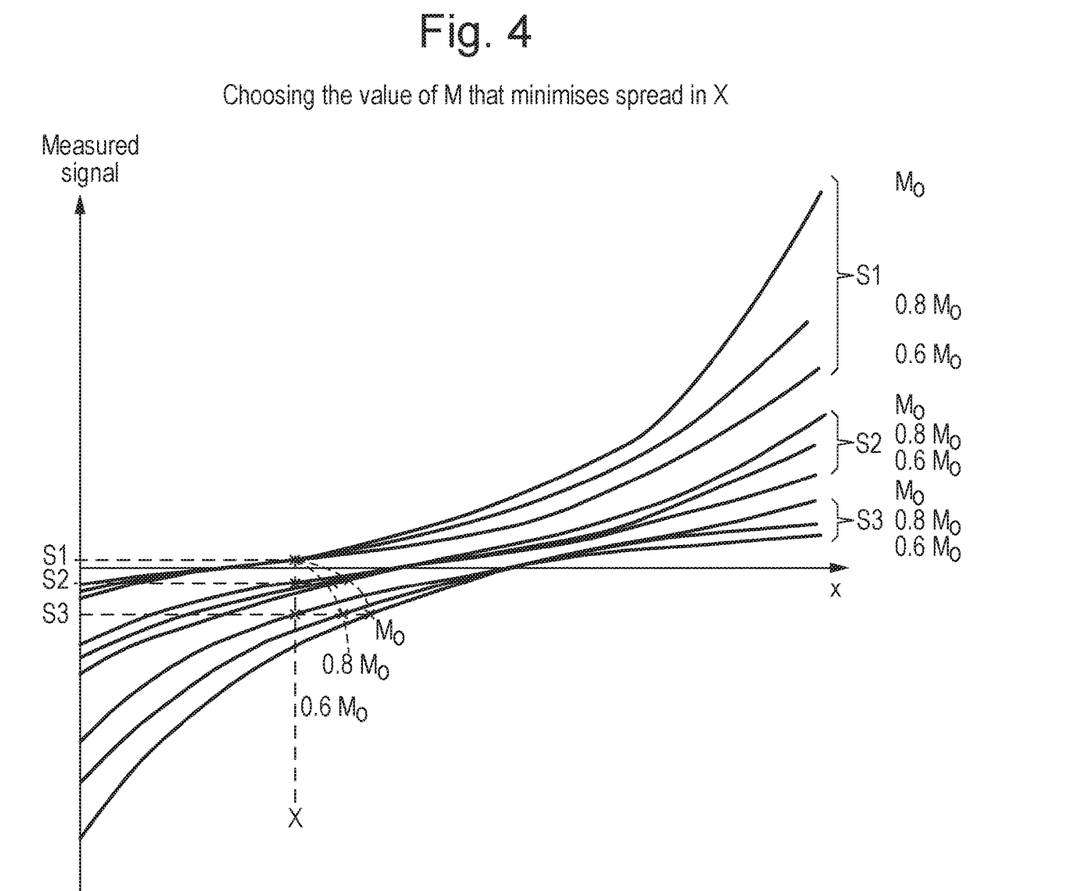
FIG. 4 shows a step in an exemplary error minimisation algorithm whereby an estimated magnetisation is determined.

It can be seen that the calibration function $c_i$ is linear in magnetic field strength. Therefore, a vertical compression of the above function illustrates a reduction in the magnetisation of the magnet 26. Consequently, a more accurate estimate of magnetisation may be obtained by vertically compressing the above function until the values of $x_i$ inferred from the signals $s_i$ measured by each sensor 26 are substantially equal i.e. finding the value of $$\frac{M}{M_0}$$

for which the Root Mean Square Error (RMSE) in $x_i$ is minimised. This is illustrated in FIG. 4.

For three sensors 26, this may be expressed mathematically as:

$$\operatorname*{argmin}_{\frac{M}{M_0}} \sum_{i=1}^{n=3} \left[ c_i^{-1}\left(\frac{s_i M_0}{M}\right) - \frac{1}{3}\sum_{i=1}^{n=3} c_i^{-1}\left(\frac{s_i M_0}{M}\right) \right]^2 \tag{3}$$

The value of $$\frac{M}{M_0}$$

obtained from Equation 3 may be used to calculate an accurate value of the displacement x of the magnet 21, which is equal to the displacement of the moving element 6 of the valve 1. For the obtained value of $$\frac{M}{M_0},$$

$$x_1 = x_2 = x_3 = x \tag{4}$$

The application of error minimisation algorithms such as this means that the accuracy of the position estimate is substantially less affected by the demagnetisation of the magnet 21. This algorithm can be performed in real-time to ensure the accuracy of valve displacement measurements.

The sensors 26 may each be configured to provide a single signal (e.g. if the sensors 26 are single axis magnetic field sensors) or multiple signals (e.g. if the sensors 26 are multiple axis magnetic field sensors).

Where one or more multiple axis sensors 26 are used, the sensor(s) 26 may be arranged to measure both a horizontal component $M_x$ and a vertical component $M_y$ of the magnetic field.

A magnetic field angle $\theta_{XY}$ may be determined according to the following equation:

$$\theta_{XY} = \tan^{-1}\frac{M_y}{M_x} \tag{5}$$

The change in the angle of the magnetic field line relative to the horizontal and vertical axes at increasing axial displacements of the valve cap 6 is substantially linear. Thus, an accurate axial position of the valve cap 6 may be determined by calculating the magnetic field angle $\theta_{XY}$ and identifying the corresponding axial displacement from a calibration curve, as discussed above.

Multiple single-axis sensors may be used rather than multiple-axis sensors. However, in this case, only steep monotonic parts of the correlation curve may be used. Determining the axial position of the valve cap 6 according to a magnetic field angle calculated in the manner described above increases the useful range of the position sensing apparatus and provides a determination that is independent of temperature fluctuations.

Figure 5:
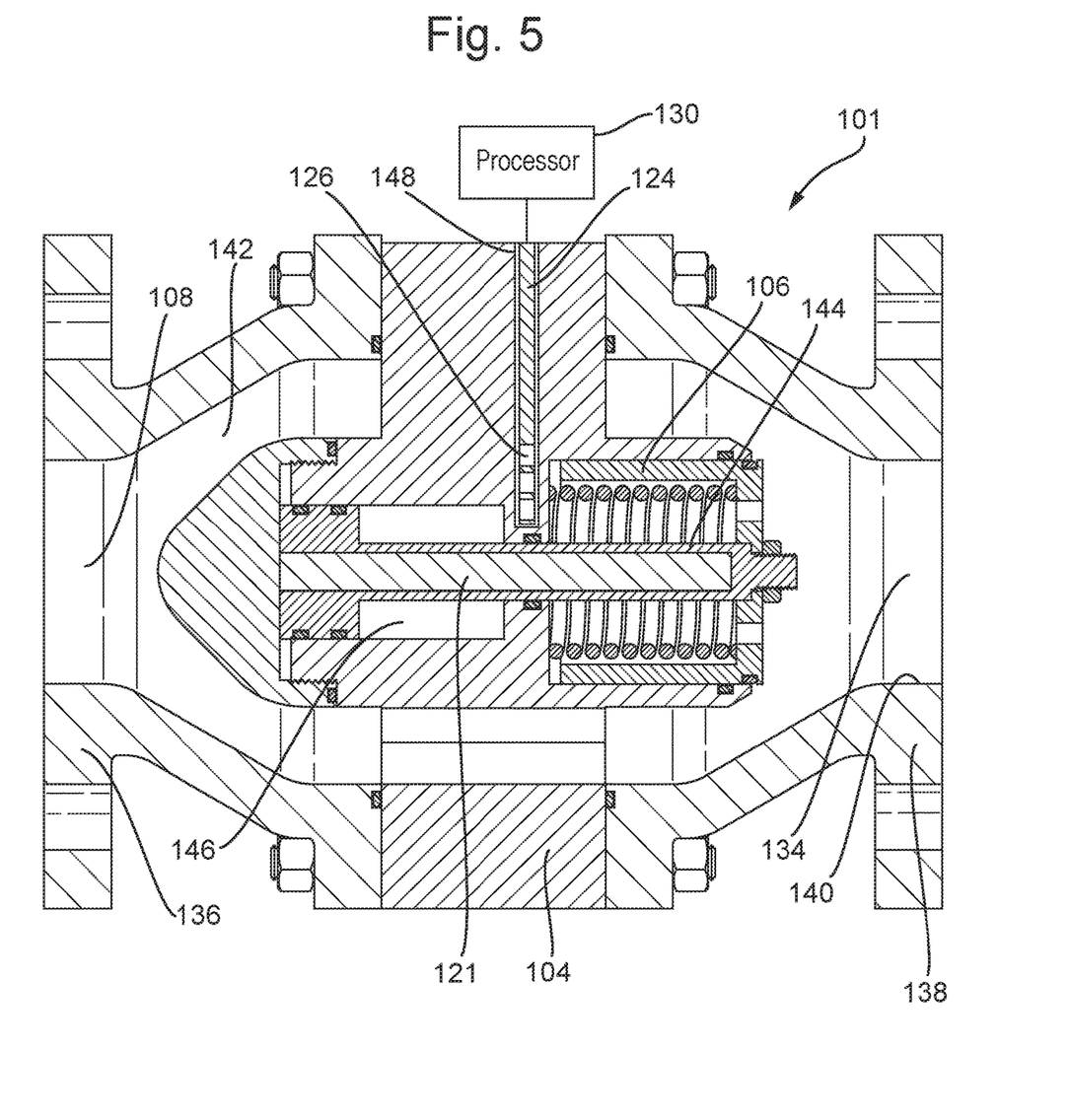
FIG. 5 shows a cross-sectional view of a device in accordance with an embodiment of the invention wherein the magnet is embedded within the movable valve member and the sensors are mounted within a radial hole in the valve core.

FIG. 5 shows a cross-sectional view of a fluid flow device 101 comprising electronic position sensing apparatus in accordance with an embodiment of the present invention. The device 101 comprises a valve core 104, an upstream valve casing 136 and a downstream valve casing 138. The upstream valve casing 136 defines an inlet aperture 108 and the downstream valve casing 138 comprises a valve seat 140 surrounding and defining an outlet aperture 134. The flow of fluid in FIG. 5 is from left to right, following a conduit 142 defined within the valve casings 136, 138.

The valve core 104 defines a central bore 146 that extends axially from the downstream end of the valve core 104 into the valve core 104. A piston 144 is located within the central bore 146 such that the piston 144 is capable of moving axially within the central bore 146 when actuated by an actuator (not shown). A valve cap 106 is attached to the downstream end of the piston 144 such that the valve cap 106 moves axially with the piston 144.

The piston 144 and valve cap 106 are movable between two extreme positions: a fully-open position and a fully-closed position. In the fully-open position, the valve cap 106 is located within the central bore 146, leaving a flow path for the flow of fluid through the outlet aperture 134 from the upstream side of the device 101 to the downstream side. In the fully-closed position, the piston 144 and valve cap 106 are moved such that valve cap 106 is sealed against the valve seat 140. This prevents the fluid from flowing through the device 101 via the outlet aperture 134.

The valve core 104 further comprises a radial hole 148 that extends into the valve core 104 from the exterior surface of the valve core 104. A PCB 124 is located within the radial hole 148 and comprises three magnetic field sensors (Hall effect sensors) 126. Electric cables fed through radial hole 148 provide power to the PCB 124 and allow measurements of the magnetic field strength to be sent from each of the sensors 126 to a processor 130.

A magnet 121 extending in the axial direction is embedded centrally within the piston 144. As the magnet 121 is rigidly embedded within the piston 144, the axial displacement of the piston 144 corresponds exactly to the axial displacement of the magnet 121. As the magnet 121 is located centrally within the piston 144, any circumferential movement of the valve cap 106 does not cause a change in distance between the magnet 121 and the sensors 126.

During normal operation of the device 101, the flow of fluid through the device 101 from the inlet aperture 108 to the outlet aperture 134 is controlled by the movement of the piston 144 and valve cap 106 by the actuator (not shown). As the valve cap 106 is moved towards the valve seat 140, the flow through the device 101 is restricted. Therefore, the fluid flow may be throttled by adjusting the axial displacement of the piston 144 and valve cap 106.

The sensors 126 continuously measure the strength of the magnetic field of the magnet 121 as it moves with the piston 144 and valve cap 106. In the same way as the above embodiment, the measurements may be processed by the processor 130 using an error minimisation algorithm in order to determine the axial position of the piston 144 and valve cap 106.

Figure 6:
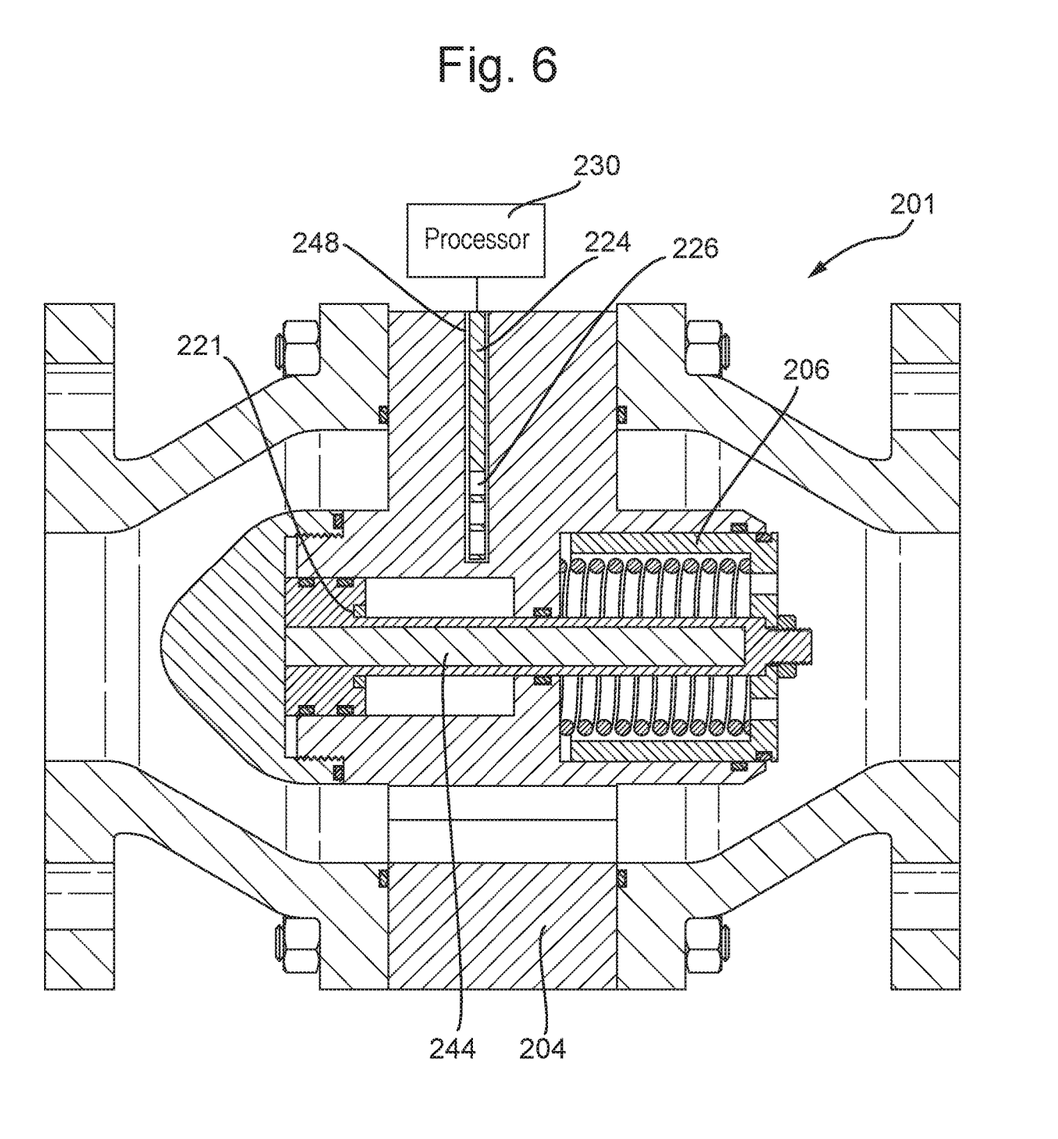
FIG. 6 shows a cross-sectional view of a device in accordance with an embodiment of the invention wherein a ring magnet is positioned along a central axis within the actuator and the sensors are mounted within a radial hole in the valve core.

FIG. 6 shows a cross-sectional view of a fluid flow device 201 comprising an electronic position sensing apparatus in accordance with an embodiment of the present invention. The device 201 is essentially the same as the device 101 discussed above. However, the axial magnet 121 has been replaced by a ring magnet 221 that is embedded within the piston 244.

A PCB 224 comprising three Hall effect sensors 226, electrically connected to a processor 230, is located within a radial hole 248. The magnet 221 is positioned within the piston 244 such that, at all axial positions of the piston 244, the sensors 226 are positioned within the end limits of the magnet 221.

Furthermore, as the ring magnet 221 is embedded centrally within the piston 244, any circumferential movement of the valve cap 206 does not cause a change in distance between the magnet 221 and the sensors 226.

During normal operation of the device 201, flow through the device 201 is throttled by the axial displacement of the piston 244 and valve cap 206. The sensors 226 continuously measure the strength of the magnetic field of the ring magnet 221 as it moves with the piston 244 and valve cap 206. In the same way as the above embodiments, the measurements may be processed by the processor 230 using an error minimisation algorithm in order to determine the axial position of the piston 244 and valve cap 206.

Figure 7:
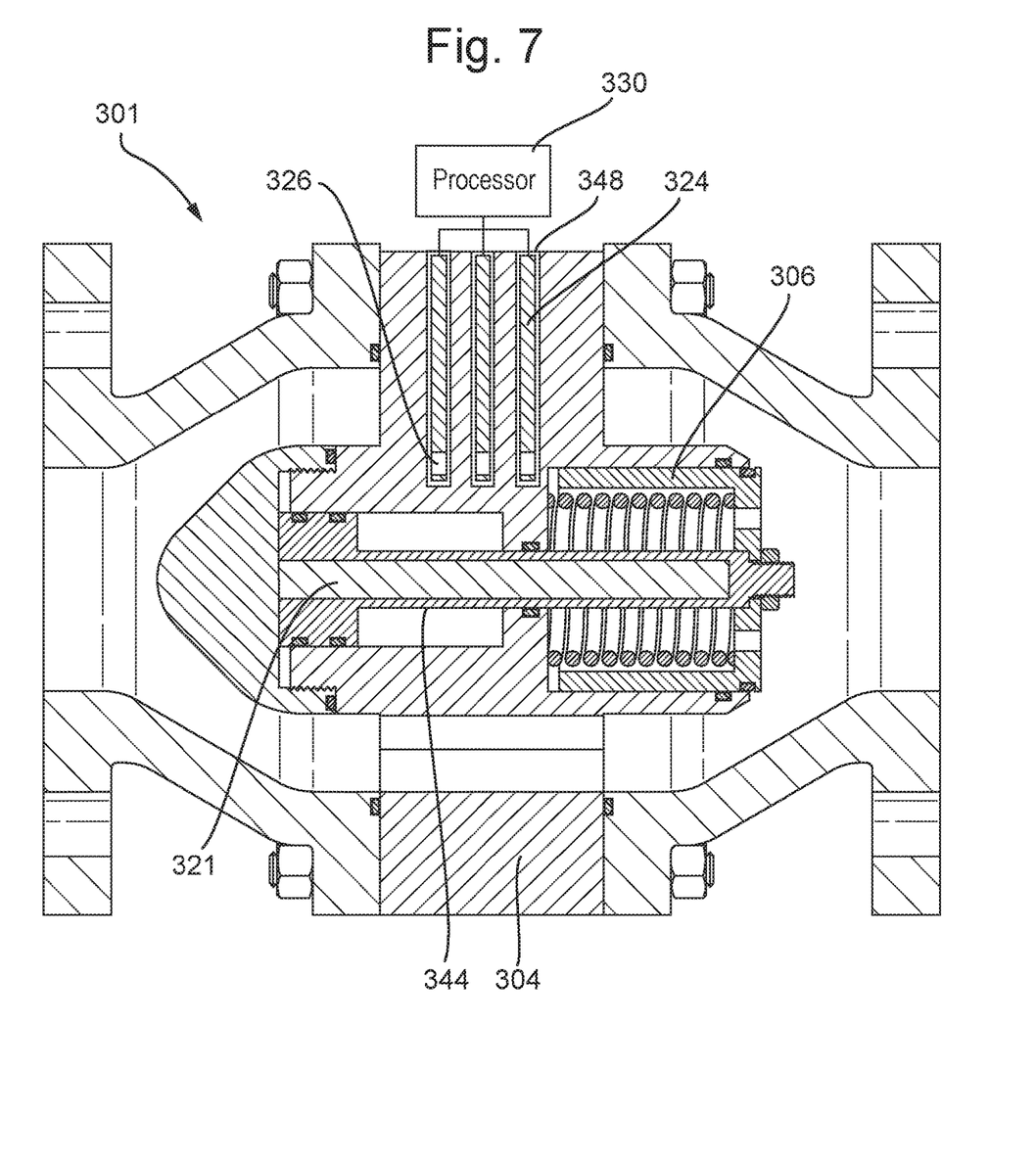
FIG. 7 shows a cross-sectional view of a device in accordance with an embodiment of the invention wherein the magnet is embedded within the movable valve member and three position sensors are mounted within three separate radial holes in the valve core.

FIG. 7 shows a cross-sectional view of a fluid flow device 301 comprising an electronic position sensing apparatus in accordance with an embodiment of the present invention. The device 301 is essentially the same as the device 101 discussed above. However, the valve core 304 comprises an additional two radial holes 348 which extend into the valve core 304 from the exterior surface of the valve core 304. The radial holes 348 are spaced axially within the valve core 304.

A PCB 324 comprising a Hall effect sensor 326, electrically connected to a processor 330, is located within each radial hole 348. The magnet 321 is positioned within the piston 344 such that, at all axial positions of the piston 344, the sensors 326 are positioned within the end limits of the magnet 321.

In the same way as the above embodiments, the sensors 326 continuously measure the strength of the magnetic field of the magnet 321 as it moves with the piston 344 and valve cap 306. The measurements may be processed by the processor 330 using an error minimisation algorithm in order to determine the axial position of the piston 344 and valve cap 306.

Figure 8:
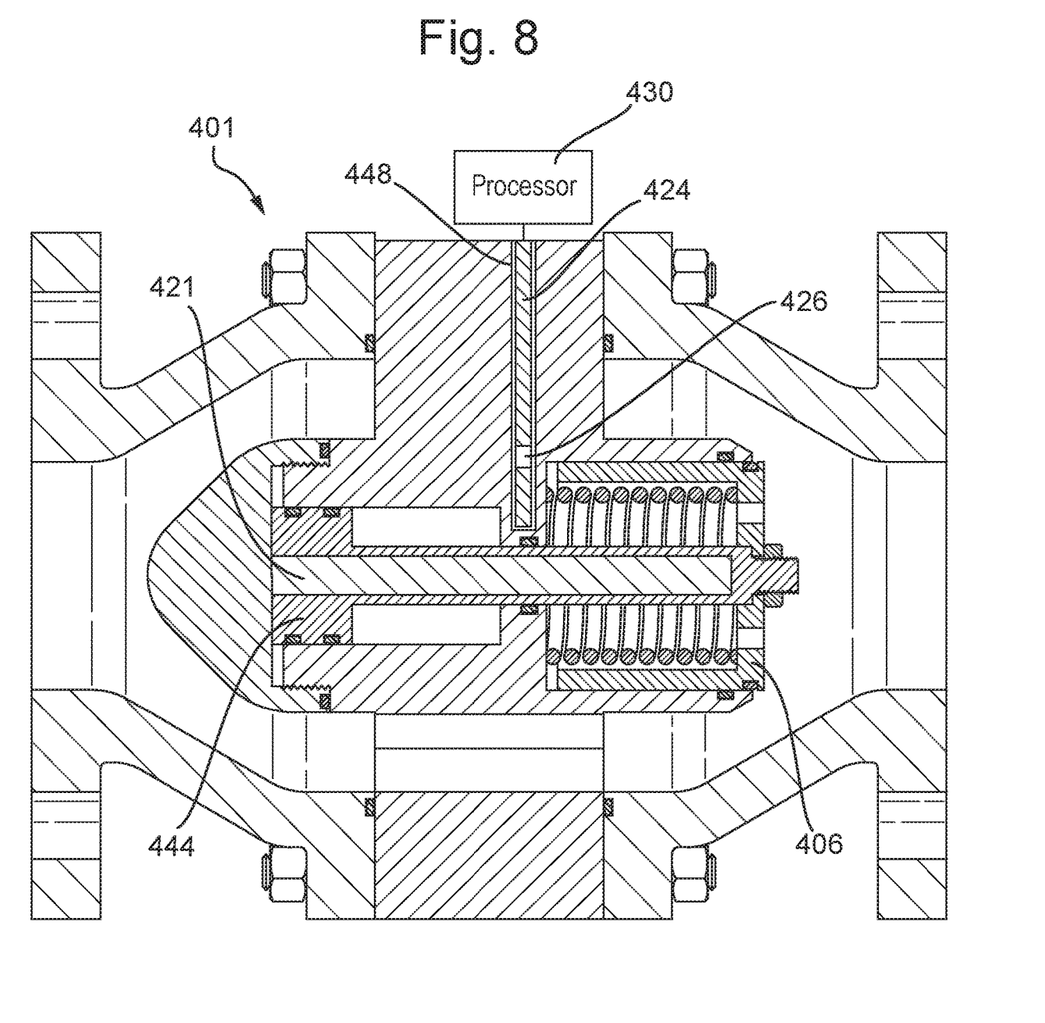
FIG. 8 shows a cross-sectional view of a device in accordance with an embodiment of the invention wherein the magnet is embedded within the movable valve member and a single position sensor is mounted within a radial hole in the valve core.

FIG. 8 shows a cross-sectional view of a fluid flow device 401 comprising an electronic position sensing apparatus in accordance with an embodiment of the present invention. The device 401 is essentially the same as the device 101 shown in FIG. 5, except the PCB 424, located within a single radial hole 448, comprises only one sensor 426. The sensor 426 is a multiple-axis (e.g. dual axis) sensor. Using only a single sensor helps to reduce the power consumed by the sensor.

In the same way as the above embodiments, the sensor 426 continuously measures the strength of the magnetic field of the magnet 421 as the magnet moves with the piston 444 and valve cap 406. The measurements may be processed by the processor 430 using an error minimisation algorithm in order to determine the axial position of the piston 444 and valve cap 406.

It can be seen from the above that, in at least preferred embodiments, the invention provides a fluid flow control device in which a magnetic position sensing apparatus having multiple magnetic field sensors is provided, such that they experience different parts of the magnetic field of a magnet mounted on or relative to the valve member of the fluid flow control device. This helps to provide a more accurate determination of the position of the valve member and may allow the measurements to be automatically calibrated for changes (e.g. degradation) of the magnetic field of the magnet with time and/or temperature.

The invention claimed is:

1. A device for controlling the flow of fluid through a conduit from an upstream side of the device to a downstream side of the device, the device comprising:
   a valve housing having defined therein a valve inlet, a valve outlet and a valve aperture, wherein the valve inlet, the valve outlet and the valve aperture are coaxial with each other;
   a valve member movably mounted relative to the valve aperture and arranged to be displaced reciprocally in an axial direction coaxial with the valve aperture to selectively open and close the valve aperture;
   a magnet that is discrete from the valve member and is not rigidly connected to the valve member, wherein the displacement of the valve member exerts a force on the magnet to displace the magnet in a direction parallel to the direction of displacement of the valve member;
   a biasing member arranged to bias the magnet towards the valve member; and
   a magnetic field sensor mounted on the valve housing.

2. The device as claimed in claim 1, wherein the valve member is coaxial with the valve aperture.

3. The device as claimed in claim 1, wherein the valve housing comprises a valve core on which the valve member is mounted, and wherein the valve member comprises a cap that surrounds, and moves over the outer surface of, the valve core.

4. The device as claimed in claim 1, wherein the magnet is mounted such that the magnet retains the same circumferential and/or radial position when the magnet is displaced by the valve member.

5. The device as claimed in claim 1, wherein the magnetic field sensor comprises a multiple axis sensor.

6. The device as claimed in claim 1, wherein the device comprises a cavity in which the magnet is located and arranged to be displaced.

7. The device as claimed in claim 6, wherein the cavity comprises a pressure balancing aperture fluidly connected to a control space.

8. The device as claimed in claim 6, wherein the biasing member is located in the cavity.

9. The device as claimed in claim 1, wherein the magnet is movably mounted on the valve housing.

10. The device as claimed in claim 1, wherein the valve member comprises an annular groove for receiving the end of the magnet.

11. The device as claimed in claim 1, wherein the magnet is mounted at a position that is radially offset from a central axis of the device.

12. The device as claimed in claim 1, wherein the valve housing comprises a cavity in which the magnetic field sensor is located.

13. The device as claimed in claim 1, wherein the magnetic field sensor is arranged at atmospheric pressure.

14. The device as claimed in claim 1, wherein the magnetic field sensor is isolated from the working fluid of the fluid flow control device.

15. The device as claimed in claim 1, wherein the device comprises a control unit arranged to determine the position of the valve member from an output received from the magnetic field sensor.

16. The device as claimed in claim 15, wherein the control unit is arranged to perform error minimisation on the output from the magnetic field sensor to determine the position of the valve member.

17. The device as claimed in claim 1, wherein the magnet comprises a permanent magnet.

18. The device as claimed in claim 1, wherein the device comprises a sheath surrounding the magnet.

19. The device as claimed in claim 1, wherein the magnet has a length that is greater than a maximum displacement of the valve member.

20. The device as claimed in claim 1, wherein:
the magnet comprises one or more grooves which extend axially along the magnet; and
the valve housing comprises a stopping member protruding from the valve housing, wherein the stopping member is arranged to project into the one or more grooves and to restrict the displacement of the magnet in the direction towards the valve member when the stopping member engages with an end of the one or more grooves.

* * * * *